US009308947B2

(12) United States Patent
Kmita et al.

(10) Patent No.: US 9,308,947 B2
(45) Date of Patent: Apr. 12, 2016

(54) VEHICLE TAILGATE WITH BUILT IN STOWAGE COMPARTMENT

(71) Applicant: JAC Products, Inc., Saline, MI (US)

(72) Inventors: Gerard J. Kmita, Allen Park, MI (US); Jeffrey M. Aftanas, Ortonville, MI (US)

(73) Assignee: JAC Products, Inc., Saline, MI (US)

( * ) Notice: Subject to any disclaimer, the term of this patent is extended or adjusted under 35 U.S.C. 154(b) by 0 days.

(21) Appl. No.: 14/510,460

(22) Filed: Oct. 9, 2014

(65) Prior Publication Data

US 2015/0102624 A1 Apr. 16, 2015

Related U.S. Application Data

(60) Provisional application No. 61/888,794, filed on Oct. 9, 2013.

(51) Int. Cl.
  *B62D 33/03* (2006.01)
  *B62D 33/04* (2006.01)
  *B62D 33/027* (2006.01)
  *B60R 9/06* (2006.01)
  *B60R 11/06* (2006.01)

(52) U.S. Cl.
  CPC . *B62D 33/04* (2013.01); *B60R 9/06* (2013.01); *B60R 11/06* (2013.01); *B62D 33/0273* (2013.01)

(58) Field of Classification Search
  CPC ...... B62D 33/04; B62D 33/0273; B60R 9/06; B60R 11/06
  USPC ................ 296/37.6, 37.5, 37.13, 57.1, 50
  See application file for complete search history.

(56) References Cited

U.S. PATENT DOCUMENTS

| 5,468,038 | A | 11/1995 | Sauri |
| 5,498,049 | A | 3/1996 | Schlachter |
| 5,518,158 | A | 5/1996 | Matlack |
| 5,730,344 | A | 3/1998 | Mauch |
| 6,199,930 | B1 * | 3/2001 | Riley ............... B60R 11/06 224/404 |
| 6,749,246 | B2 | 6/2004 | Landwehr |
| 6,811,067 | B2 | 11/2004 | Muizelaar et al. |
| 6,843,519 | B2 | 1/2005 | Ojanen |
| 6,923,354 | B2 | 8/2005 | Axelson |

(Continued)

FOREIGN PATENT DOCUMENTS

| WO | 03049974 A1 | 6/2003 |
| WO | 2008025340 A1 | 3/2008 |

OTHER PUBLICATIONS

Jalopnik. http://www.Jalopnik.com, believed to have been published Apr. 3, 2013.

*Primary Examiner* — Jason S Morrow
*Assistant Examiner* — E Turner Hicks
(74) *Attorney, Agent, or Firm* — Harness, Dickey & Pierce, P.L.C.

(57) ABSTRACT

A tailgate stowage system is disclosed for use with a motor vehicle having a door-like element. The stowage system involves the use of a bin having a bin lid and a bin body hingedly connected to the bin lid. The bin lid may be opened to permit access to an interior area of the bin body, and may be closed to contain at least one component within the stowage bin. The bin lid and bin body form a compartment when the bin lid is in a closed orientation to enable the component to be stowed therein. At least one mounting latch may be used for securing the bin within the recess of the tailgate, and which permits removal of the bin from the recess without the use of external tools.

22 Claims, 18 Drawing Sheets

(56) References Cited

U.S. PATENT DOCUMENTS

| | | |
|---|---|---|
| 7,090,275 B2 | 8/2006 | Pero |
| 7,097,224 B2 | 8/2006 | Lester et al. |
| 7,731,260 B2 * | 6/2010 | Heller ................ B62D 33/0273 296/24.4 |
| 2004/0207226 A1 | 10/2004 | Johnson |
| 2005/0062309 A1 | 3/2005 | Juzwiak et al. |
| 2007/0006867 A1 | 1/2007 | Karney et al. |
| 2007/0090662 A1 | 4/2007 | Katterloher et al. |
| 2007/0196201 A1 | 8/2007 | Kennedy |
| 2007/0286697 A1 * | 12/2007 | Kmita ....................... B60P 7/15 410/150 |
| 2008/0190977 A1 * | 8/2008 | Estabrook .......... B62D 33/0273 224/404 |
| 2008/0231067 A1 * | 9/2008 | Nagle ....................... B60P 3/07 296/50 |
| 2010/0230209 A1 | 9/2010 | Hughes et al. |
| 2012/0325877 A1 | 12/2012 | Franks |
| 2013/0019417 A1 | 1/2013 | Kenny |

* cited by examiner

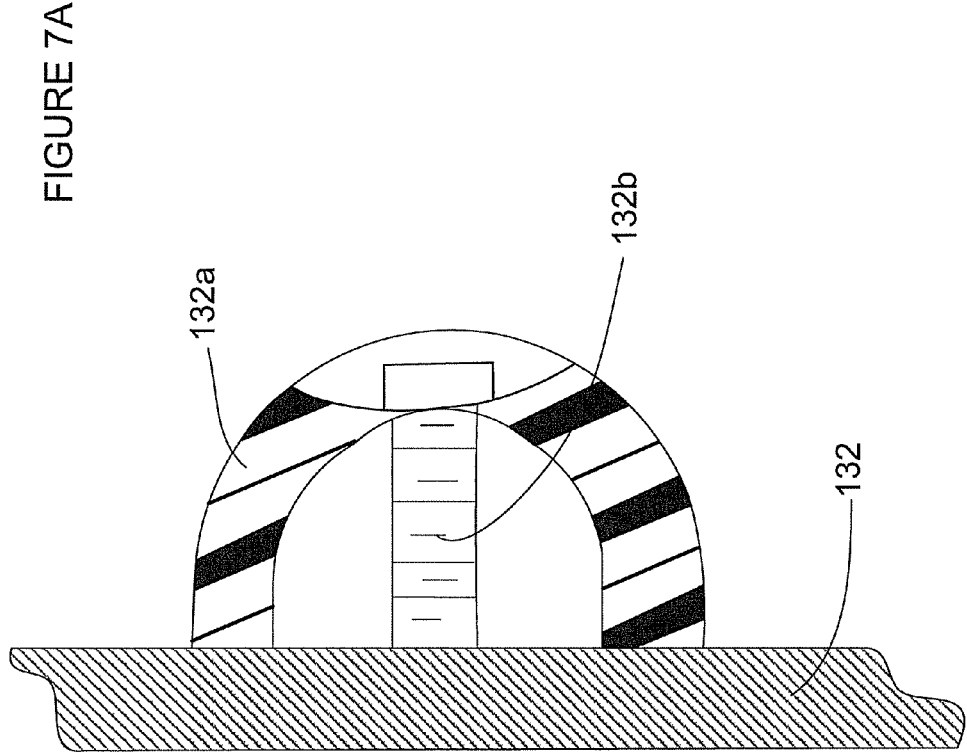

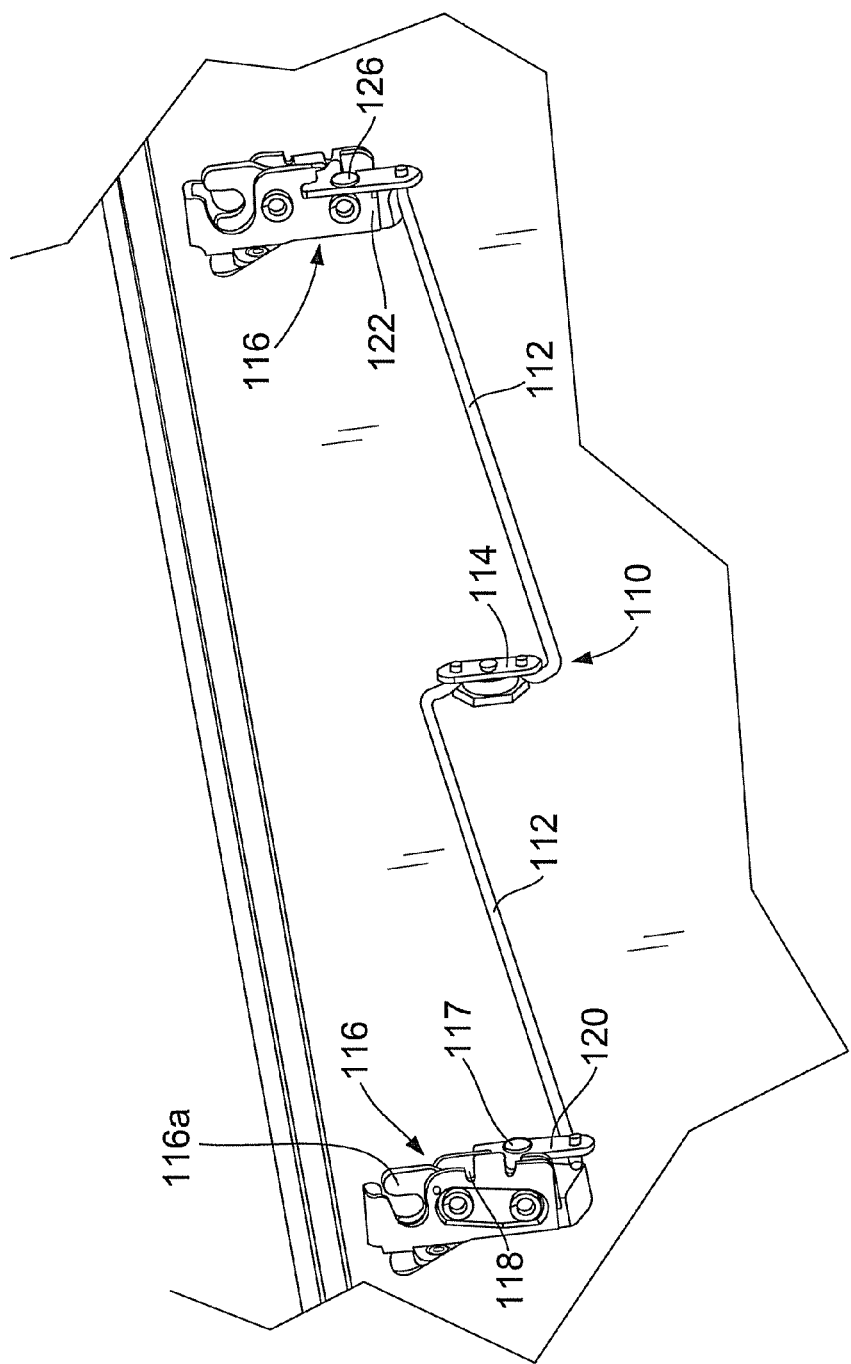

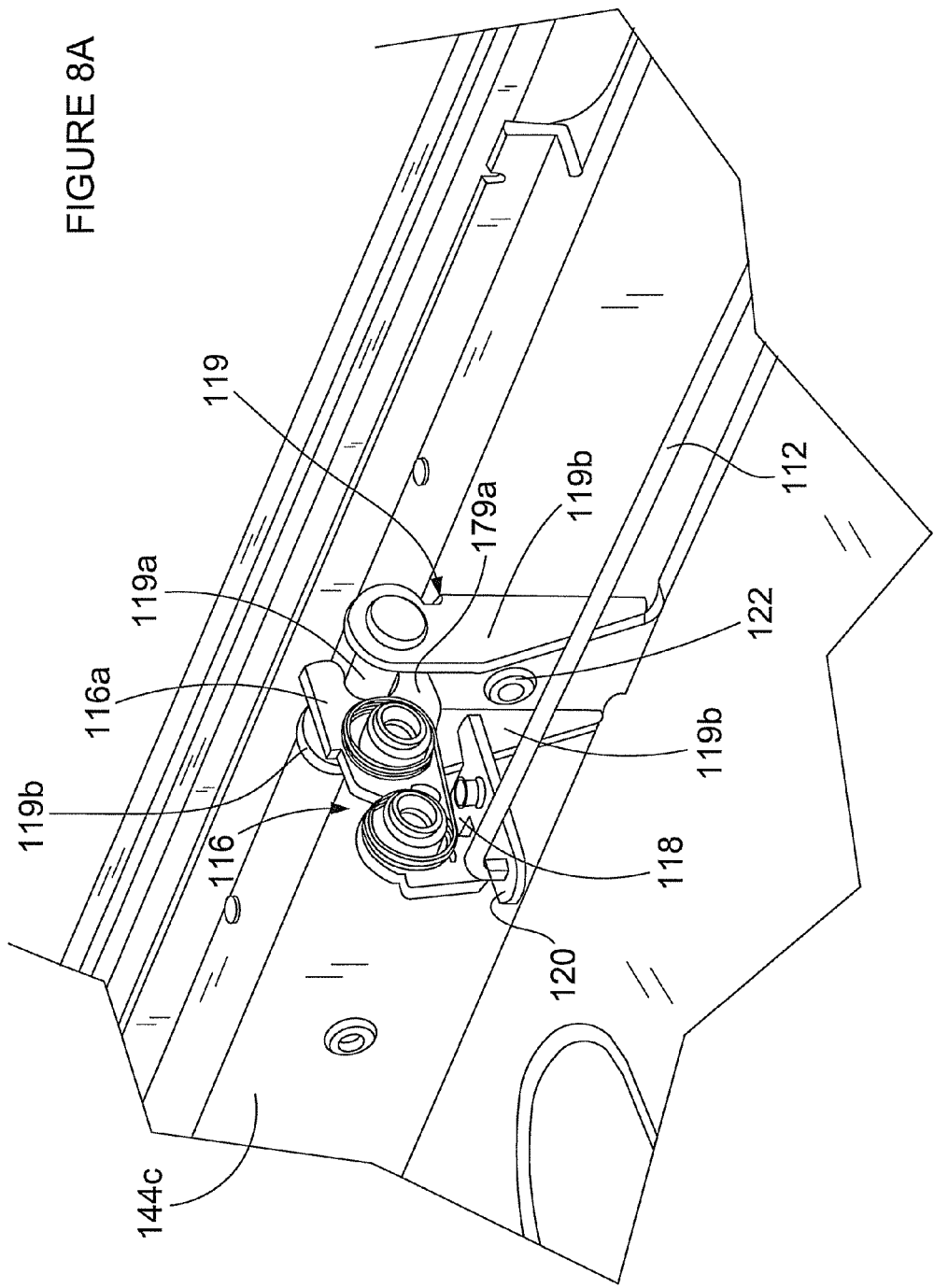

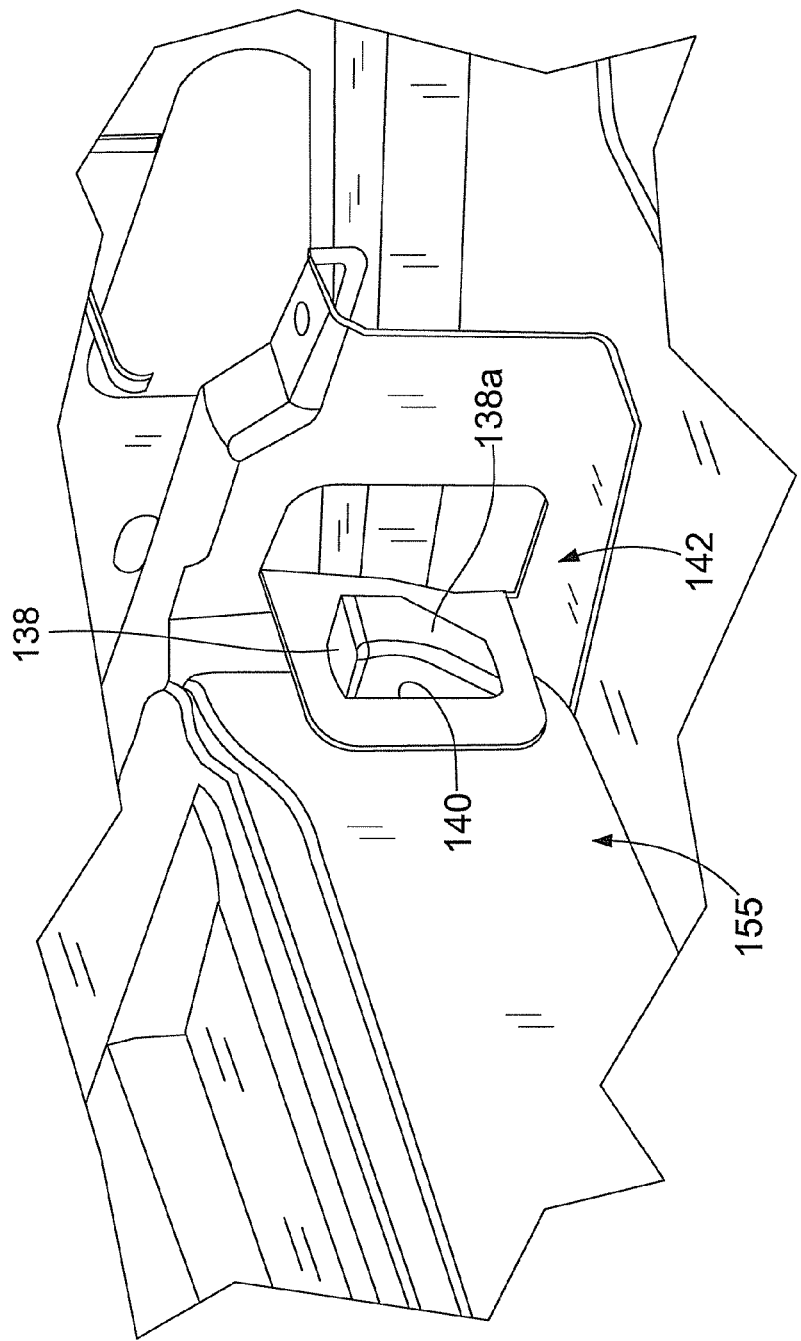

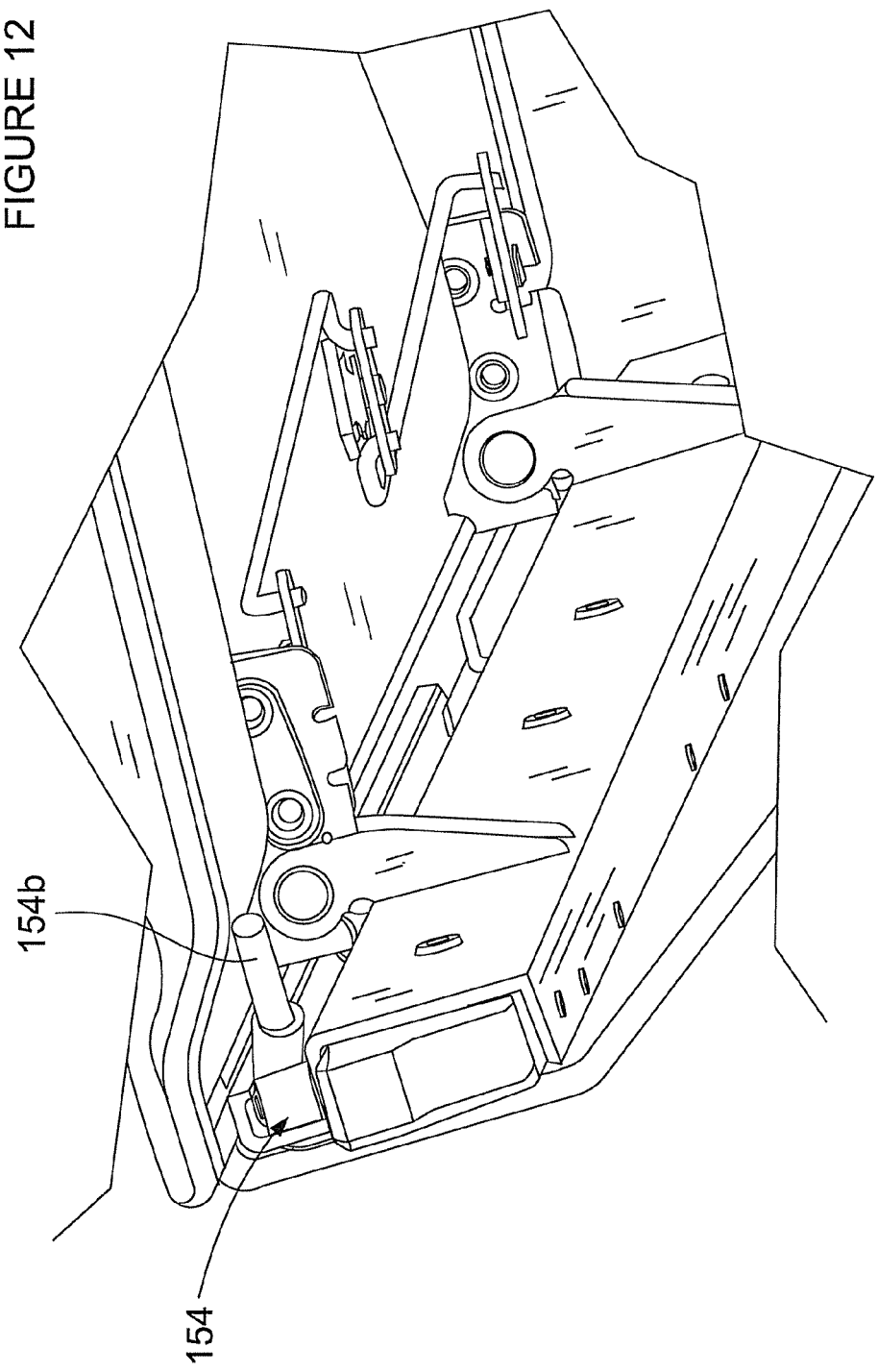

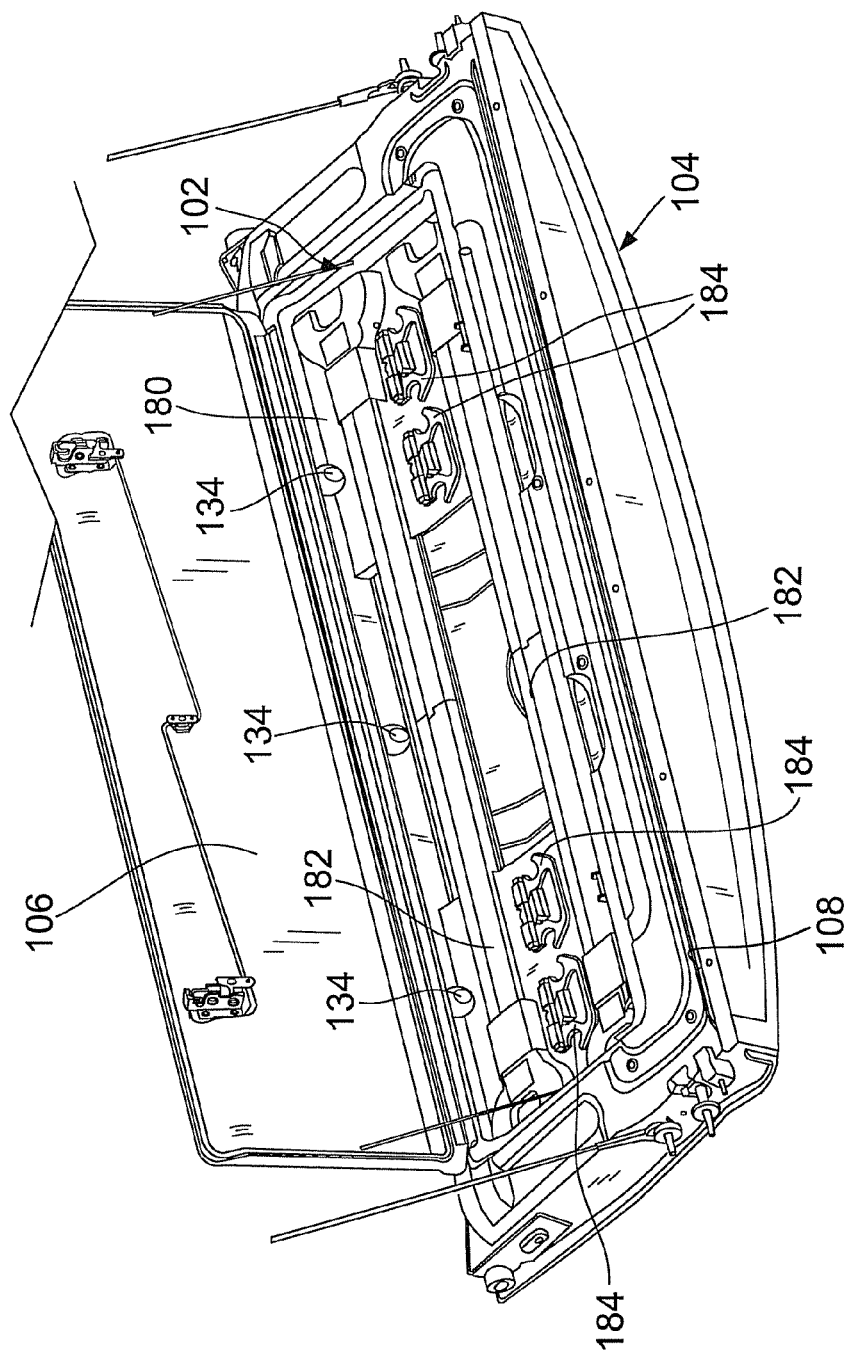

VEHICLE TAILGATE WITH BUILT IN STOWAGE COMPARTMENT

FIELD

The present disclosure relates to stowage systems for motor vehicles, and more particularly to a stowage system incorporated into a tailgate of a motor vehicle for storing various articles and article securing components in an organized, secure fashion.

BACKGROUND

The statements in this section merely provide background information related to the present disclosure and may not constitute prior art.

The popularity of pickup trucks has grown significantly in recent years. Such vehicles have always been popular with contractors, and such contractors often use their pickup trucks as their main mode of transportation outside of work. Pickup truck ownership has also grown with non-contractors, in part due to the increasing refinement and comfort of present day pickup trucks, as well as the utility that non-contractors find in having such a vehicle that is capable of transporting a wide variety of cargo.

One limitation with pickup trucks has been the lack of any built-in stowage system for containing items typically carried by contractors and individuals. Such items may include load supporting cross bars; bed partitioning cross bars; miscellaneous items such as battery jumper cables and emergency markers that may be deployed on a road to notify on-coming traffic of a stalled or otherwise inoperable vehicle; and other small tools. Often the pickup truck owner has kept some of these types of items in a separate tool box in the cabin of the vehicle or in the bed of the vehicle. However, some items such as cargo supporting cross bars or load partitioning cross bars are too big to fit in most tool boxes, and must therefore be stored in the cabin or in the bed of the vehicle. This is undesirable for the obvious reason that storing such items in the cabin takes up valuable room that may be needed for passengers riding in the vehicle. Storing such items in the bed when they are not needed for use may be undesirable because they can potentially interfere with other cargo that needs to be carried in the bed of the vehicle, or they may shift around in the bed unless they are restrained with suitable restraints such as bungee cords.

As such, there is still a need for some type of stowage system that does not use valuable space inside the cabin or within the bed of a pickup truck.

SUMMARY

In one aspect the present disclosure relates to a stowage system for use with a door-like element of a motor vehicle, wherein the door-like element includes a recess formed therein. The system may comprise a stowage bin having a bin lid and a bin body hingedly connected to the bin lid to permit the bin lid to be opened, to permit access to an interior area of the bin body, and to permit the bin to be closed to contain at least one component within the stowage bin. The bin lid and bin body form a compartment when the bin lid is in a closed orientation to enable the component to be stowed therein. At least one mounting latch may be included for securing the stowage bin within the recess of the door-like element. The mounting latch permits removal of the stowage bin from the recess without the use of external tools.

In another aspect the present disclosure relates to a load restraining and stowage system for use with a tailgate of a motor vehicle, wherein the motor vehicle includes a bed and the tailgate is able to be moved into a lowered position to gain access to the bed. The system may comprise a load restraining bar having a length sufficient to span a width of the bed, and releasably securable to vertical sidewall portions of the bed to extend between the vertical sidewall portions. The load restraining bar acts as a load restraining component to help prevent movement of articles placed within the bed while the vehicle is moving. A recess may also be formed in the tailgate. A stowage bin may be placed in the recess in the tailgate for stowing articles therein. The stowage bin may include a bin lid hingedly secured to a bin body such that the stowage bin forms a compartment within which the load restraining bar can be stowed when not in use in the bed. A locking mechanism may be used which secures the bin lid in a closed orientation relative to the bin body. A pair of mounting latches may enable the stowage bin to be releasably secured within the recess in the tailgate, and to be removed completely from the recess, without the need for external tools.

In still another aspect the present disclosure relates to a load restraining and stowage system for use with a tailgate of a motor vehicle, wherein the motor vehicle includes a bed and a tailgate that is able to be moved into a lowered position to gain access to the bed. The system may comprise a pair of support rails secured to vertical sidewalls of the bed. A pair of load restraining bars may be included which each have a length sufficient to span a width of the bed. Each load restraining bar may have a telescopic construction to enable it to assume a first length when secured in the bed to the pair of support rails, to thus help restrain an article being transported in the bed against movement, and a second length which is shorter than the first length when the load restraining bar is configured to be stowed in the tailgate. A recess is formed in the tailgate. A stowage bin may be placed in the recess in the tailgate. The stowage bin may include a bin lid and a bin body hingedly secured together along edges thereof such that the bin lid forms a cover and an inside wall surface of the tailgate, and the stowage bin forms a compartment within which the load restraining bars can be stowed when not in use in the bed. A pair of spring biased mounting latches may be arranged along a rear wall portion of the bin body. The spring biased mounting latches engage with structure associated with the tailgate to secure the rear wall of the stowage bin within the recess. A pair of release latches may be included which are operably associated with the spring biased mounting latches. The release latches are each engageable with one or more fingers of a user's hand to permit the user to use the release latches to slidably move the mounting latches into retracted positions. A double U-shaped track may be included which has a first track portion within which the mounting latches are mounted, a second track portion within which the release elements are mounted, and a pair of openings in which portions of the release elements may engage to hold the mounting latches in their retracted positions when the user releases the release latches. The bin body may also include structure enabling a forward wall portion of the bin body to be held by additional structure associated with the tailgate, such that the stowage bin is fully suspended within the tailgate and restrained against movement.

BRIEF DESCRIPTION OF THE DRAWINGS

The drawings described herein are for illustration purposes only and are not intended to limit the scope of the present disclosure in .any way. In the drawing figures:

FIG. 7a is a side cross sectional view of a portion of a forward wall of the recess in the tailgate, with a resilient bumper mounted thereon, which is used to engage a forward wall portion of the stowage bin body to support the bin body against vibration and rattling when the bin body is positioned in the recess in the tailgate;

FIG. 8 is a perspective view showing a locking mechanism disposed on an inside surface of the bin lid for locking the bin lid in a closed position;

FIG. 8a is a perspective view of one of the latch assemblies secured to a latching bracket;

FIG. 11a is a partial perspective view of a portion of the stowage bin showing a rear corner portion of the bin engaged with an opening in a structural member of the tailgate, which prevents the rear portion of the bin from being lifted out of the tailgate;

FIG. 12 is a perspective view of a portion of the stowage bin which better illustrates the second track portion of a double U-shaped track which is used to help enable sliding movement of the release elements, as well as to provide a structure which the spring biased latches of the locking mechanism can latch onto when the bin lid is closed and the locking mechanism is placed in an unlocked condition via a key;

FIG. 15 is a perspective view of the stowage system of FIG. 1 incorporating an insert tailored to accommodate a pair of load restraining bars and a plurality of tie down cleats.

DETAILED DESCRIPTION

Figure 1:
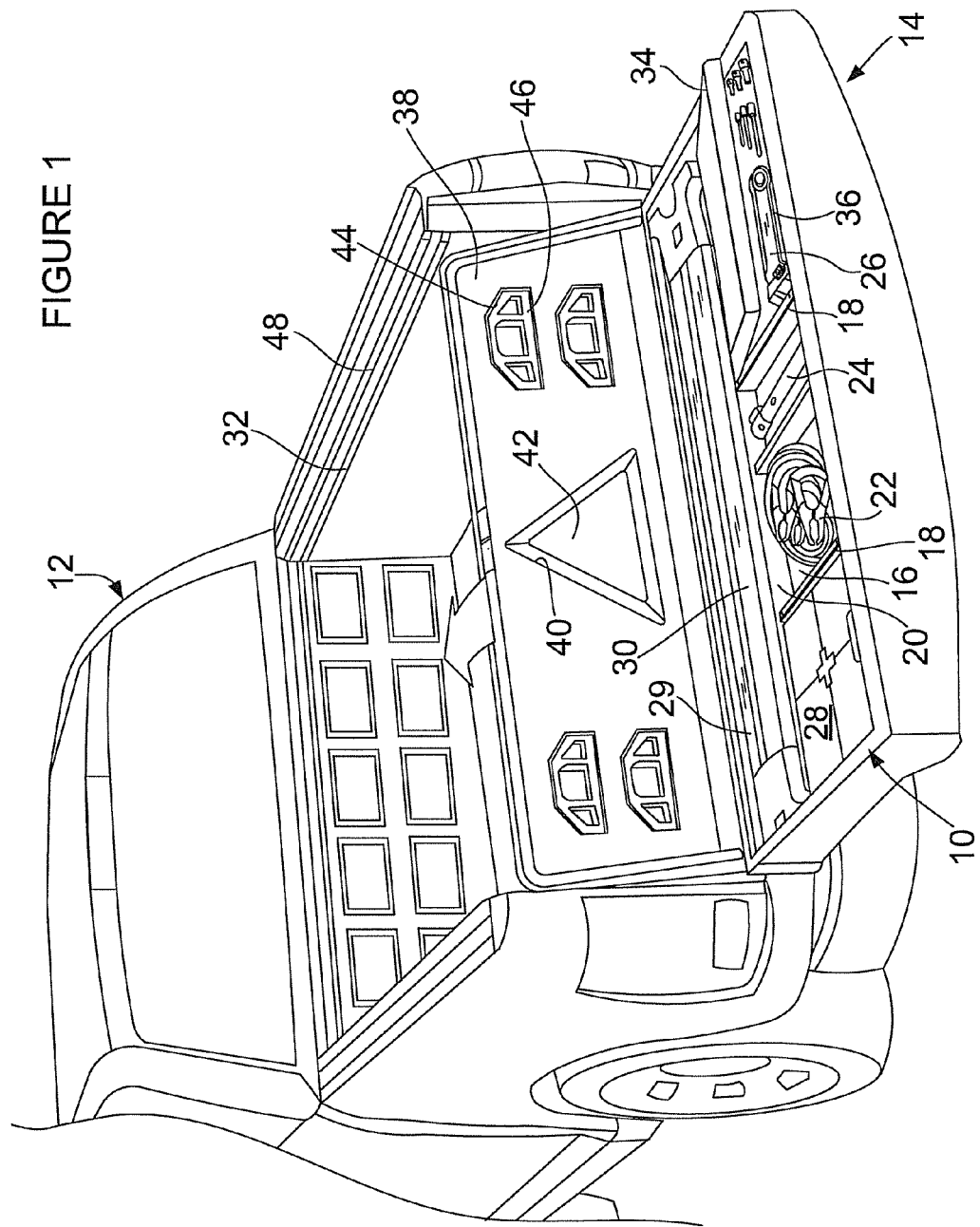
FIG. 1 is a perspective view of a stowage system for a pickup truck which is integrated into the tailgate of the vehicle, and with the system in its open configuration revealing the individual stowage areas within the tailgate.

The following description is merely exemplary in nature and is not intended to limit the present disclosure, application, or uses. It should be understood that throughout the drawings, corresponding reference numerals indicate like or corresponding parts and features.

Referring to FIG. 1 there is shown a tailgate stowage system 10 in accordance with one embodiment of the present disclosure. The system 10 is incorporated into a tailgate 14 of a vehicle such as a pickup truck 12. However, it will be appreciated that the system 10 could be integrated into the tailgate of any other type of vehicle, for example a sport utility vehicle (SUV), and is thus not restricted to use with only pickup trucks.

The system 10 is integrated into the tailgate 14 of the vehicle 12 through a floor panel 16 which forms a floor for all components being stowed by the system 10. Additional walls 18 form compartments for various articles such as battery jumper cables 22, a large flashlight 24, miscellaneous tools 26, and a first aid pack 28. These are but some of the different types of cargo items that the system 10 is able to stow, and it will be appreciated that the precise configuration of the system 10 may be varied to stow other types of items as well. As such, the system 10 is not limited to stowing only the cargo items shown in FIG. 1.

The system 10 includes a wall 20 that helps to form a compartment 29 for a pair of removable cross bars 30. The cross bars 30 may be used as article supporting cross bars which support articles thereon (e.g., bicycle rack, ski rack, etc.). The cross bars 30 may also be used as cargo restraining bars that can be positioned along rails 48 in the bed 32 of the vehicle 12 to restrain smaller cargo items from shifting around within the bed. A separate pivotally attached and liftable wall member 34 may be used to enclose a tool compartment 36 in which the tools 26 are stowed.

Figure 3:
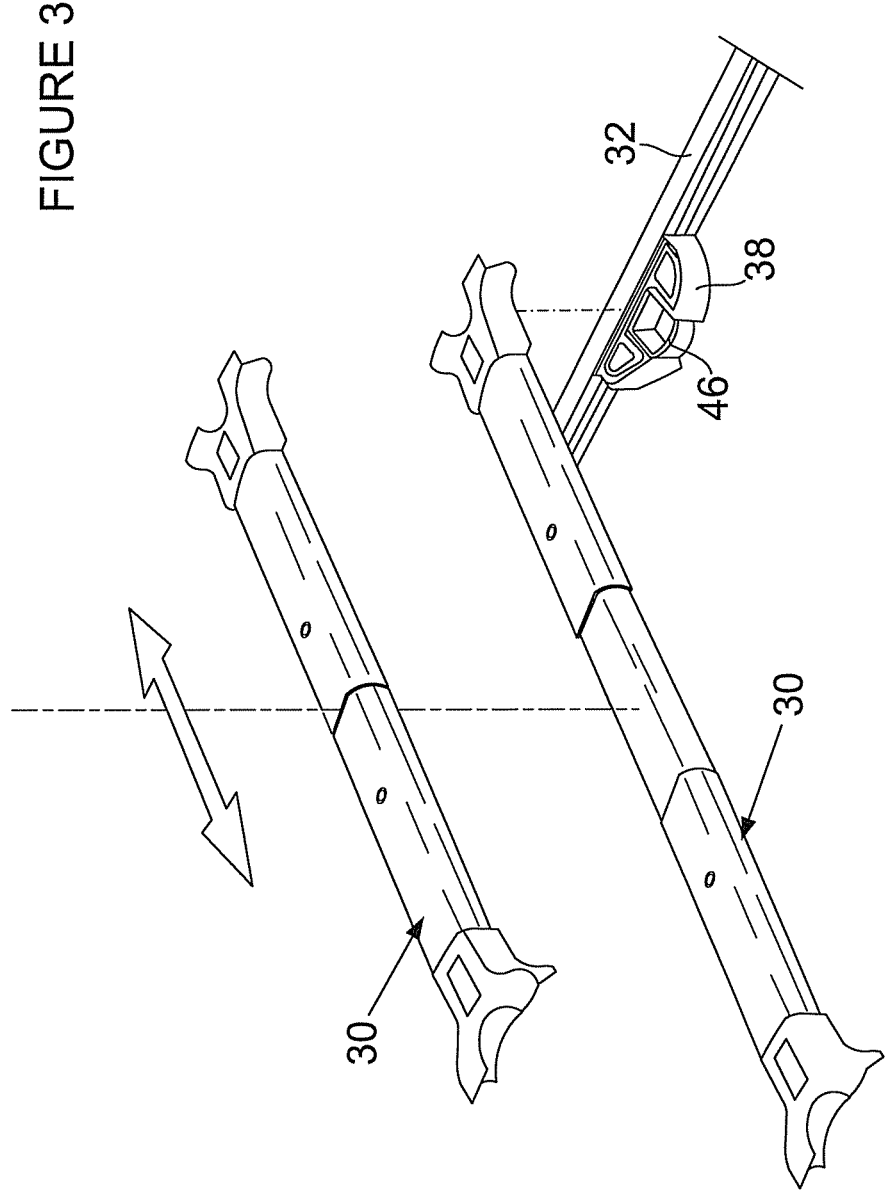
FIG. 3 is a perspective view of the cross bars of the system along with support components that may be used to enable the user to adjustably position the cross bars in the vehicle bed.

A pivotally secured and liftable cover panel 38 cargo may be used to enclose the items being stowed in the tailgate 14. The cover panel 38 itself may have a recessed area 40 for carrying a "Caution" or warning sign 42. Recessed areas 44 may carry support components 46 for use with the cross bars 30 and the support rails 48. In this regard brief reference may be made to FIG. 3 which shows one of the support components 46 attached to one of the rails 48 on an inside wall of the bed 32. It will be appreciated that a pair of inwardly facing rails 48 are incorporated in the bed 32 on opposite sides of the bed, although only one such rail is visible in FIGS. 1 and 3. Such an adjustable cargo restraining system that makes use of adjustably positionable cross bars is more fully described in U.S. Pat. No. 7,387,482 to Aftanas et al., assigned to JAC Products, Inc., the assignee of the present application, and which is hereby incorporated by reference into the present application. In this example the cross bars 30 are telescopically expandable to span the full width of the bed 32 and are releasably attached to the support components 46. FIG. 3 shows cross bar 30 in its expanded position and also in its retracted position. Since the cross bar 30 may be slidably telescopically retracted, it can be made sufficiently short in overall length to fit within the tailgate 14 when it is to be stowed. The cross bars 30 may also be selectively positioned at an infinite number of positions along the rails 48 as needed to restrain a wide variety of types of cargo.

Figure 2:
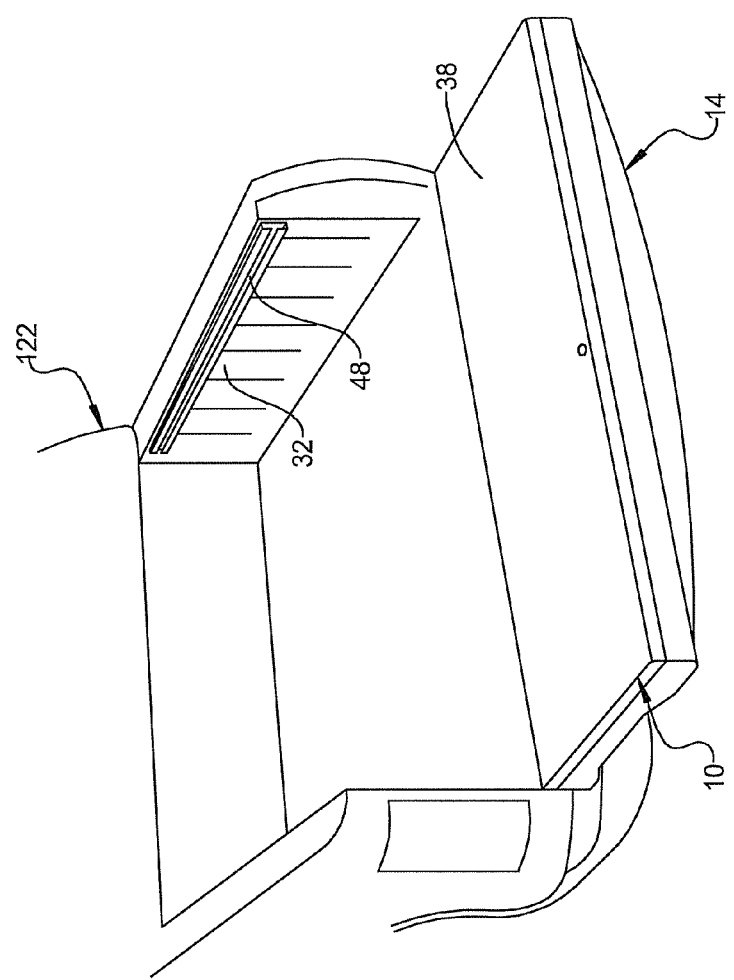
FIG. 2 is a perspective view of the stowage system of FIG. 1 but with a cover of the system in the closed position.

With further reference to FIG. 2 it can be seen that the cover panel 38 may incorporate a suitable handle assembly 50, which may be recessed slightly. The handle assembly 50 may also incorporate a lock (not shown). When the cover panel 38 is closed, it forms a substantially or completely flush surface that helps to maintain the items held within the tailgate 14 in a secure manner so as to avoid rattling or other noises while the vehicle is moving over rough or uneven surfaces.

Figure 4:
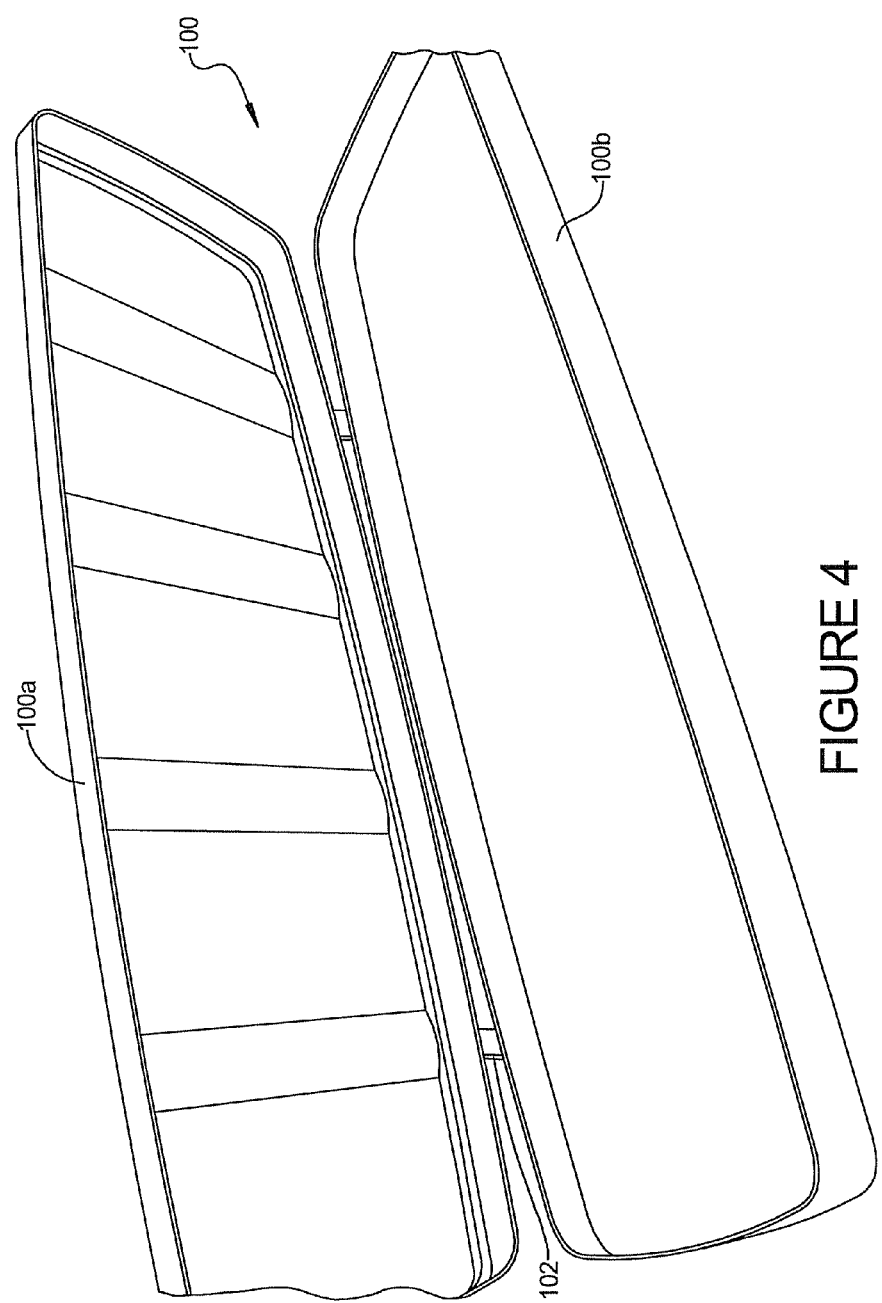
FIGS. 4 and 5 show a bin in accordance with another embodiment of the present disclosure that may be positioned in a similarly shaped recess of a tailgate, and where the bin includes two hingedly secured halves that may include one or more compartments for housing various articles therein.
Figure 5:
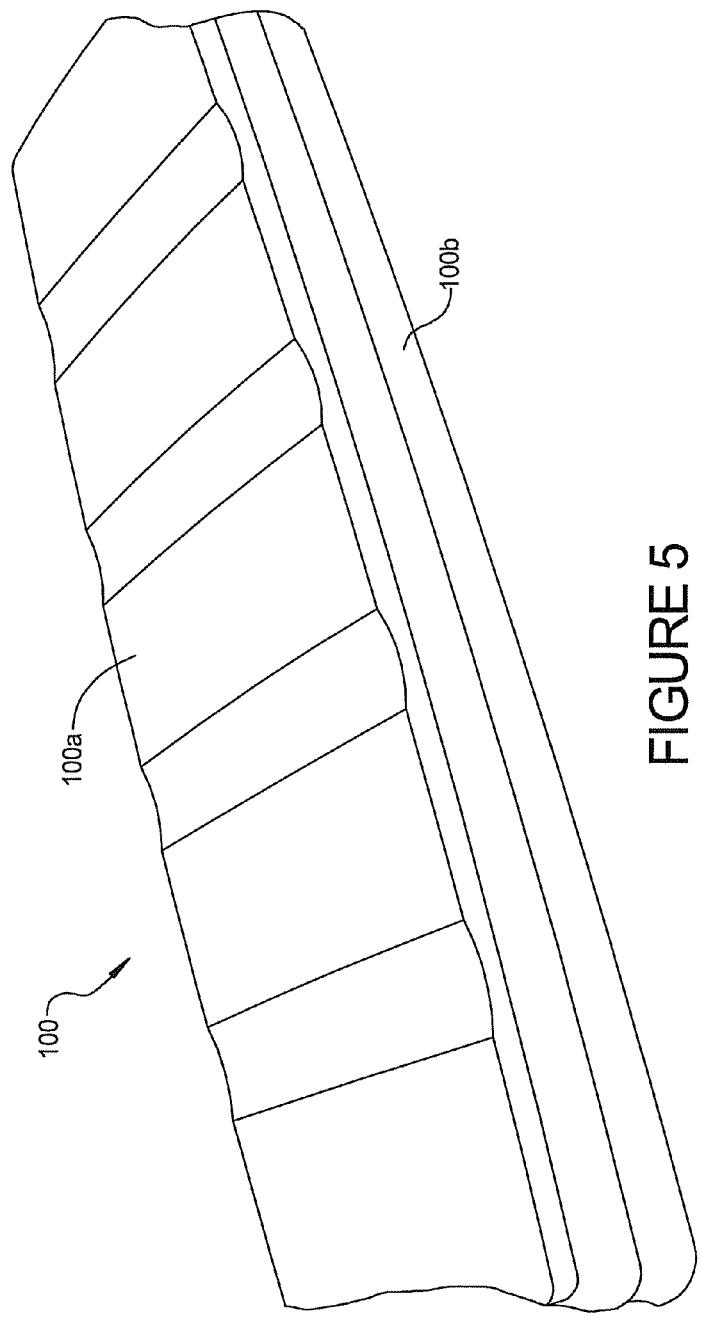

Referring to FIGS. 4 and 5, in another embodiment the present disclosure may involve the use of a bin 100 that is secured within a suitable shaped recess of the tailgate 14. The bin may include two halves 100a and 100b secured to one another by suitable hinge straps 102 or other like structure that enables the two halves 100a and 100b to be hingedly opened and closed. Optionally, a lock may be included that restricts access to an interior area of the bin 100 unless the lock is accessed with the appropriate key. The bin halves 100a and 100b may have compartments formed therein that are specifically cooperatively shaped for securing various predetermined items, for example load restraining cross bars 30 shown in FIG. 3, as well as a wide variety of other items. The bin 100 may be molded from a high strength plastic which yields an extremely strong, lightweight subsystem that can be quickly and easily installed in a suitably shaped recess in the tailgate 14 by conventional fasteners or clamps. The bin 100 may be secured with fasteners that are accessible by hand or by using tools so that the bin 100 may be removed for cleaning if needed. The half 100a may form an exposed inner wall of the tailgate 14 when the tailgate is in use (i.e., in its up position).

Figure 6:
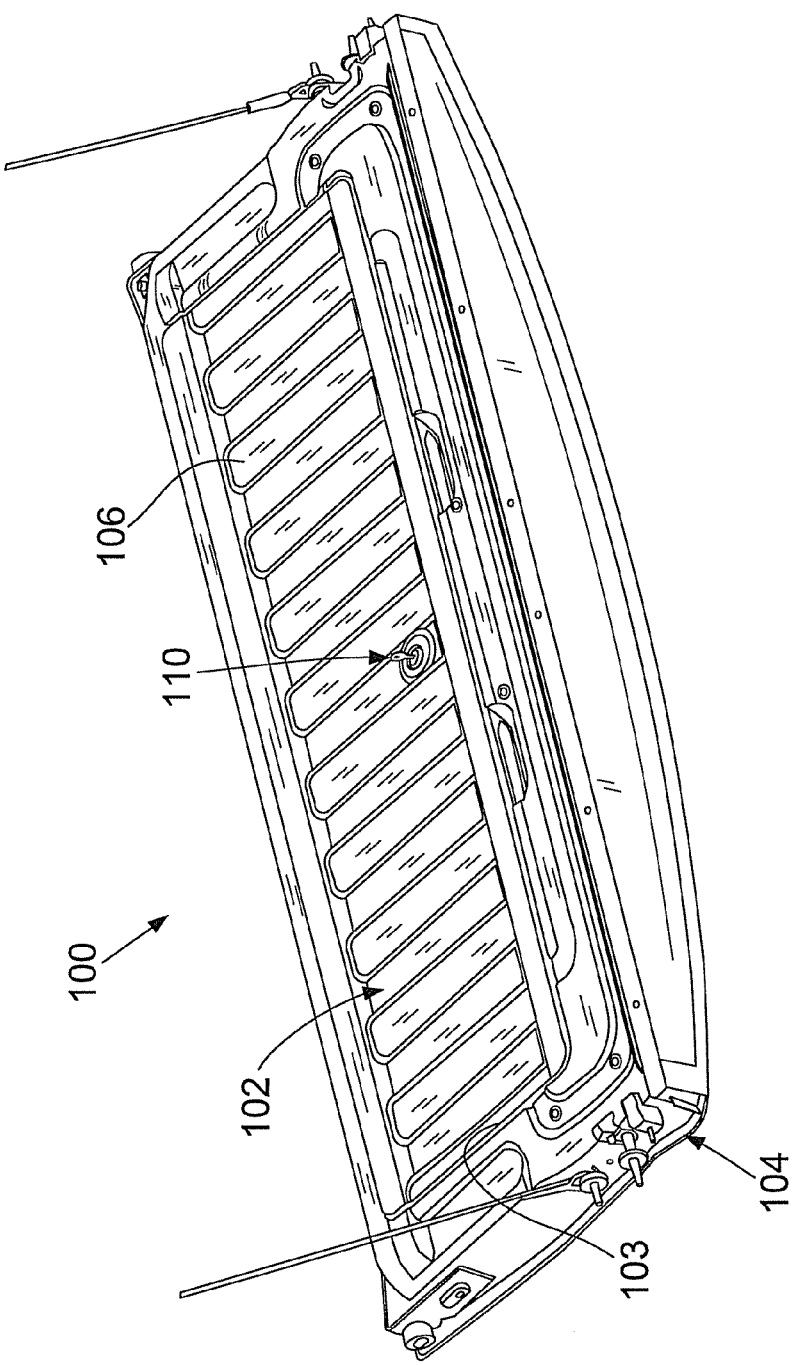
FIG. 6 is a perspective view which shows another embodiment of the present disclosure with a stowage bin in its closed orientation held within a recess in the tailgate of the vehicle of FIG. 1.

Referring to FIG. 6, another tailgate stowage system 100 is shown in accordance with another embodiment of the present disclosure. The system 100 is similar to the system 10 but incorporates a number of unique, highly useful additional features. The system 100 includes a removable stowage bin 102 which is releasably retained in a recess 103 in a door-like element of a vehicle. In this example the door-like element is a tailgate 104 of a vehicle, for example the tailgate of pickup truck 12 of FIG. 1. It will be appreciated immediately that the vehicle could just as easily be, without limitation, a van or SUV that has a liftgate or a swing out door. The system 100 could also be easily adapted for a floor of a cargo area of a van or a trunk area of a sedan, although it is expected that use of the system 100 with pickup truck tailgates will be especially popular.

Figure 7:
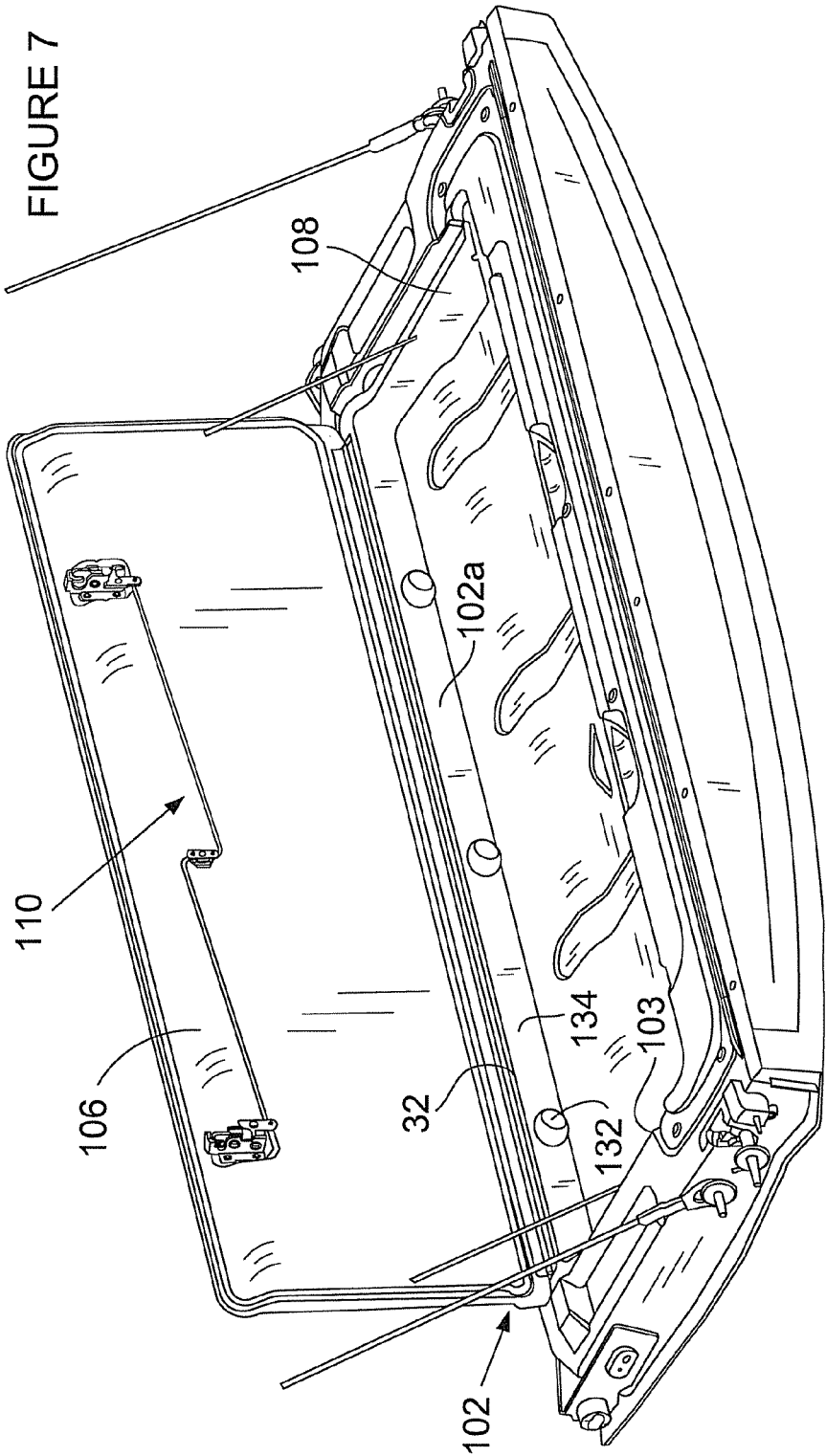
FIG. 7 is a perspective view which shows the stowage bin of FIG. 6 with a bin lid of the stowage bin in a raised position exposing an interior area of a bin body of the stowage bin.

FIGS. 6 and 7 show the stowage bin 102 of the system 100 having a bin lid 106 and a bin body 108 to which the bin lid is pivotally secured. Both of the bin lid 106 and the bin body 108 may be made from a suitably high strength material such molded plastic or possibly even from aluminum. A locking mechanism 110 may be used to lock the bin lid 106 in a closed orientation to protect articles stowed in the stowage bin 102.

The locking mechanism 110 is shown in greater detail in FIGS. 8 and 8a. As shown in FIG. 8, the locking mechanism 110 may comprise, as one example, a standard, key actuated bell crank mechanism using a pair of rods 112 which are secured to a rotatable crank assembly 114, and a latch assembly 116 which is responsive to linear movement of the rods 112 to lock or unlock the bin lid 106. The bell crank assembly 114 is rotatable using a key and simultaneously moves a latch 116a of each of the latch assemblies 116 between open and closed positions. The latch assemblies 116 in this embodiment are commercially available, off the shelf components available from Eberhard Manufacturing Company of Strongsville, Ohio, and as such a detailed description of these devices will not be provided. However, these components are shown in FIG. 8 without their housings to better illustrate the internal parts thereof. The latch 116a is movable by virtue of its engagement with a tab 118 of a rotationally mounted plate 120 attached to an end of each rod 112. The tab 118 of each plate 120 is able to move pivotally by virtue of being mounted by a rivet-like element 117 to a flange (not visible) of a housing of the latch assembly 116. Rotation of the tab 118 causes rotational movement of the latch 116a. An internal torsion spring in the latch assembly 116 tends to bias the latch 116a into the locked position shown in FIG. 8. The locking mechanism 110 may thus be used to actuate the latch assemblies 116 simultaneously, to lock or unlock the bin lid 106 using a key inserted into the bell crank assembly 114.

Figure 9:
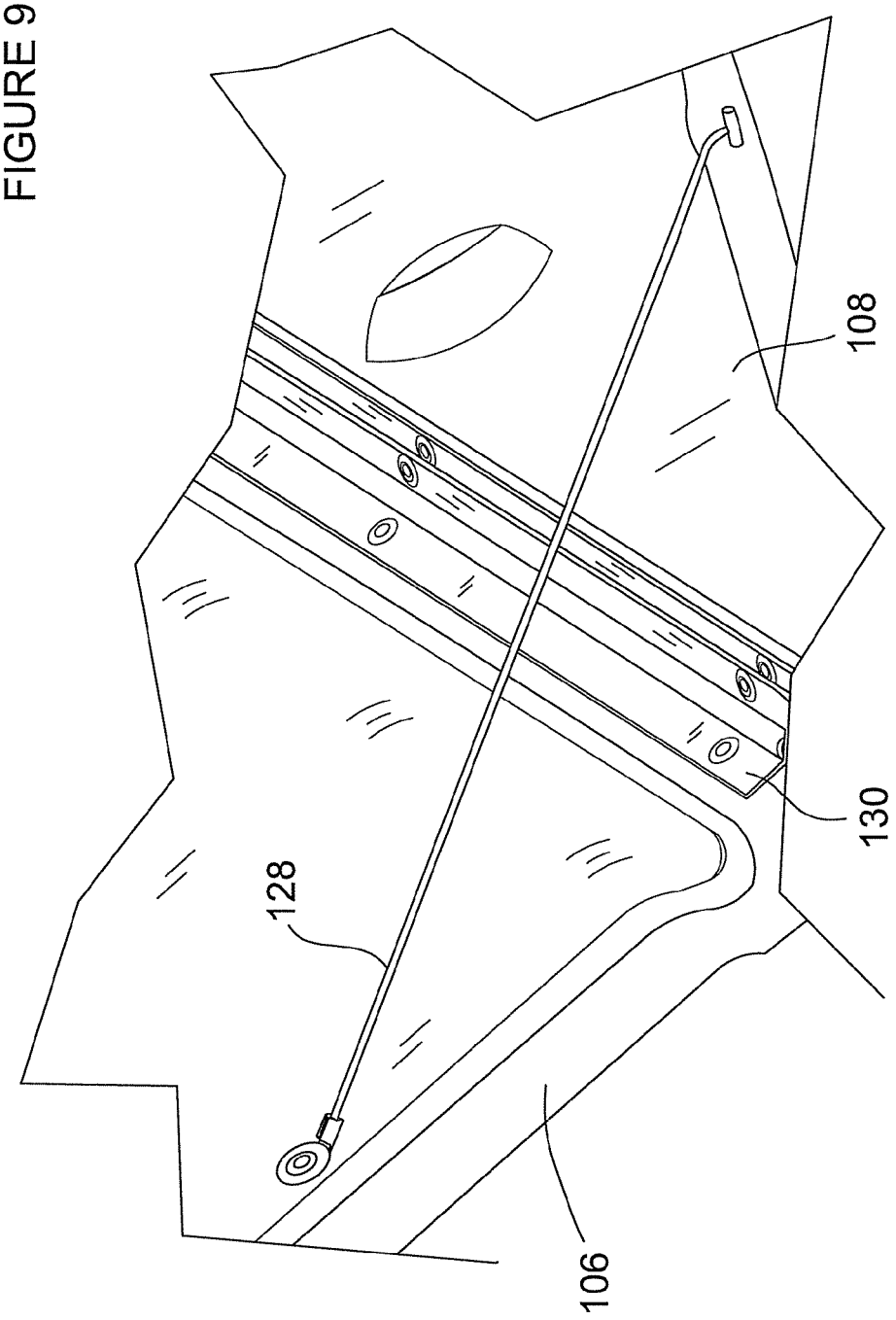
FIG. 9 is a partial perspective view of a portion of the stowage bin illustrating a cable that may be used to limit opening motion of the bin lid.

Referring briefly to FIG. 9, a short length of cable 128, for example stainless steel cable, may be fixedly secured to both the bin body 108 and the bin lid 106 to limit opening movement of the bin lid 106 to a predetermined maximum travel. A hinge 130 may be used to pivotally mount the bin lid 106 relative to the bin body 108.

Referring further to FIGS. 7 and 7a, the removable stowage bin 102 may be removed completely from the recess 103 in the tailgate 104. To maintain the removable stowage bin 102 mounted within the tailgate 104 without vibration or rattling, a plurality of spaced apart resilient bumpers 132a (e.g., rubber bumpers) may be mounted, such as by threaded fasteners 132b, along a forward wall area 132 of the recess 103, as shown in FIG. 7a. The resilient bumpers 132a may be shaped and dimensioned to engage with a plurality of correspondingly shaped and dimensioned recesses or pockets 134 formed in a forward wall 102a of the bin body 108. With brief reference to FIG. 10, at a rearward wall edge 136 of the bin body 108, a latching element in the form of a mounting latch 138 may be disposed at each side of the bin body 108. The mounting latches 138 are identical so only the mounting latch 138 will be described in detail with reference to FIGS. 10 and 11.

Figure 10:
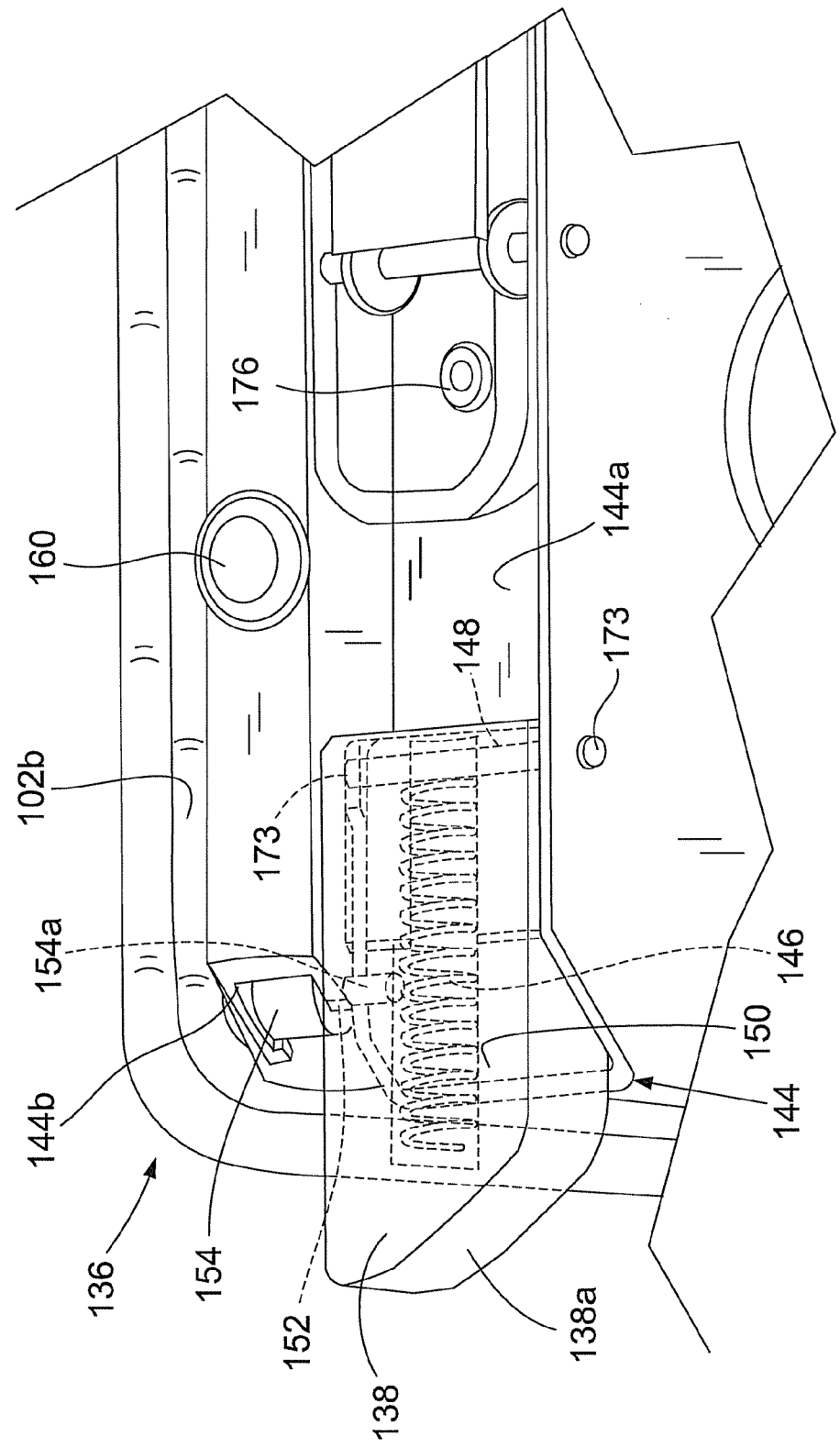
FIG. 10 is a perspective view of a rear corner portion of the stowage bin with the bin removed from the tailgate recess, to better illustrate one of the mounting latches which is used to secure the bin in the recess of the tailgate.
Figure 11:
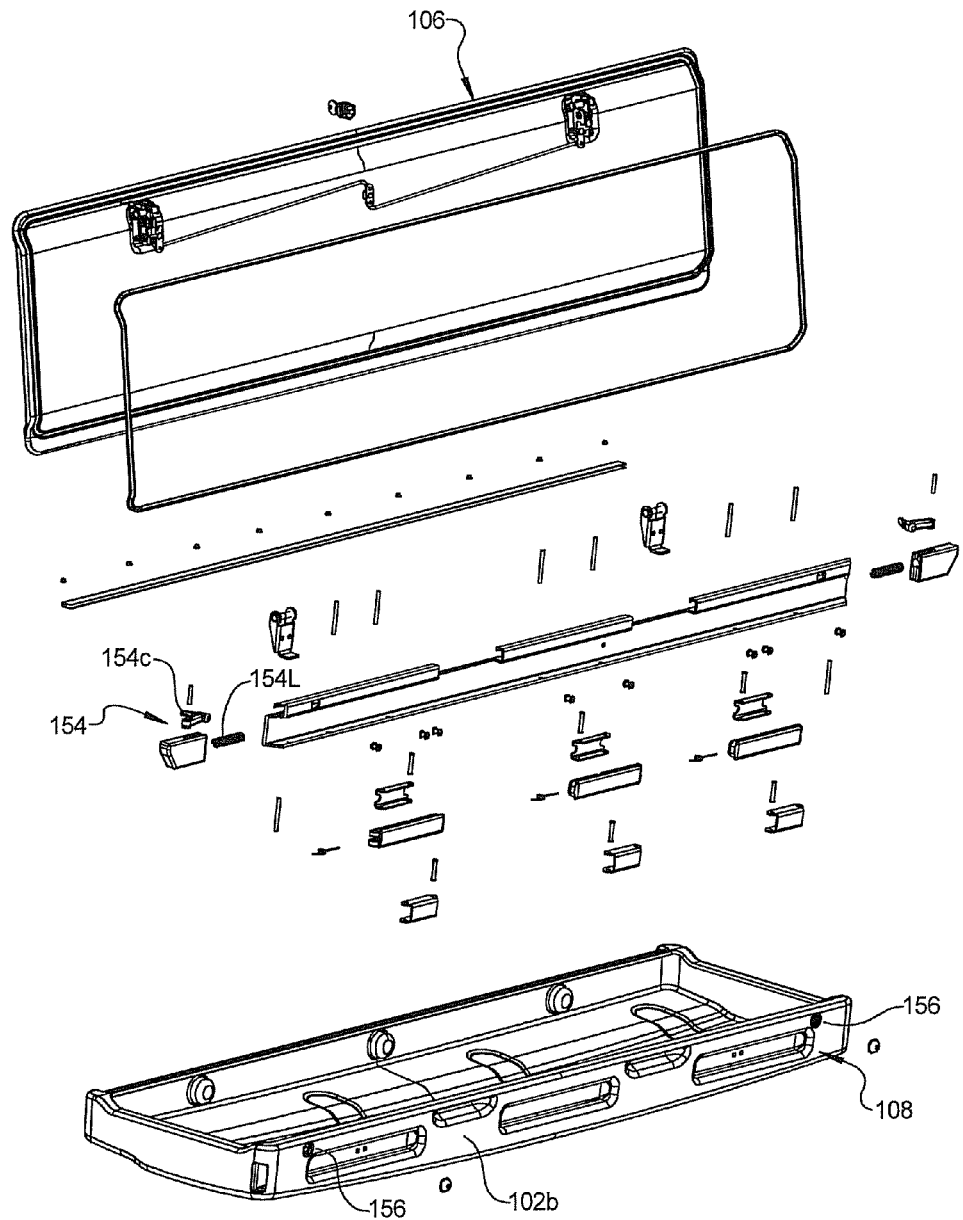
FIG. 11 is an exploded perspective view of a plurality of the individual component parts of the stowage bin.

With reference to FIGS. 10, 11 and 11a, the mounting latch 138 includes a tapered end 138a which is able to seat within a cutout or opening 140 in a structural wall portion 142 of the tailgate 104, as indicated in FIG. 11a. In FIG. 10, the mounting latch 138 is mounted for sliding movement within a first track portion 144a of a double U-shaped track 144. The mounting latch 138 includes an internally housed spring 146 which seats against a stop member 148 within the mounting latch 138. The spring 146 is also positioned within a semicircular recess 150 formed within the mounting latch 138. The mounting latch 138 also includes a slot 152 within which a leg 154a of a user engageable release element 154 is positioned. The track 144 may be fixedly secured to the rear wall 102b of the bin body 108, for example, by a plurality of rivets 176 or any other suitable fastening elements.

With reference to FIGS. 10 and 12, the release element 154 is positioned within a second track portion 144b of the double U-shaped track 144. The release element 154 can be seen to include a curved portion 154b which may be easily engaged with a finger of a user. While the bin lid 106 is open, by using a finger, a user may pull the release element 154 inwardly to retract the mounting latch 138. When this action is performed simultaneously on both mounting latches 138, a rearward area 155 of the stowage bin 102 can be lifted clear from the recess 103 in the tailgate 104. It should be appreciated that the release elements 154 are not accessible when the bin lid 106 is closed. As such, the stowage bin 102 is not removable from the recess 103 unless the user has used a key to unlock the bin lid 106 and has opened it. This forms a convenient security feature.

Figure 13:
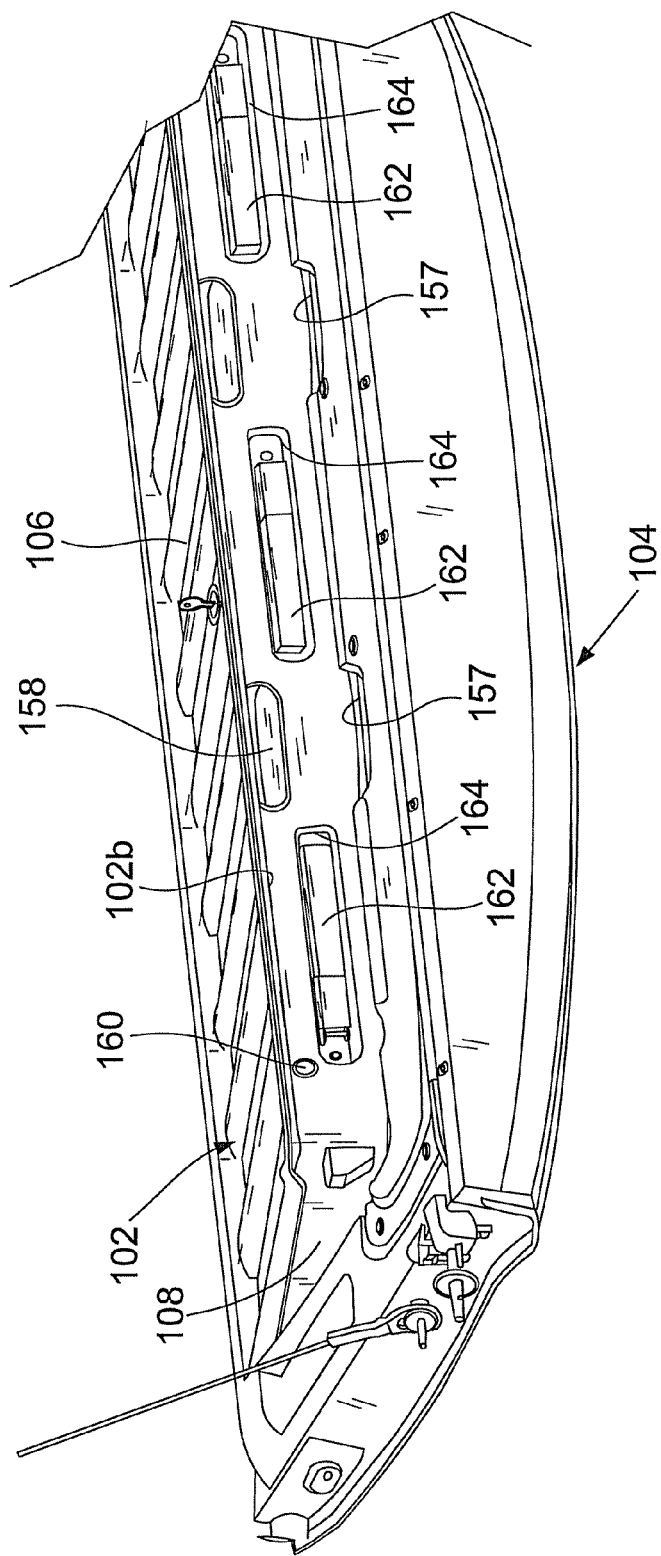
FIG. 13 is a perspective view of a rear corner portion of the tailgate with the stowage bin partially lifted therefrom, to expose one of the mounting latches as well as the handles that can be used to transport the stowage bin once it is fully removed from the tailgate.

To maintain the mounting latch 138 in its fully retracted position, the release element may include an elbow portion 154c, as shown in FIG. 11. The elbow portion 154c may engage within an opening 156 in the rear wall 102b of the bin body 108, where the opening 156 is positioned in accordance with a fully retracted position of the release element 154. Thus, once both of the release elements 154 are fully retracted and engaged with their respective openings 156, the user may release his/her fingers from the release elements 154 and both of the release elements will be held in their fully retracted positions. The bin body 108 may then be lifted out from the recess 103, as indicated in FIG. 13, by the user using one or more fingers of each hand to engage recesses 158 formed in the real wall 102b of the bin body 108. Optional recesses 157 formed in the tailgate 104 may help the user to engage the recesses 158.

To release each of the release elements 154 from their retracted positions, the user may depress a resilient rubber grommet-like button 160 that is positioned in each of the openings 156. Pushing on the rubber grommet-like buttons 160 serves to push the elbow portion 154c of each release element 154 out from the openings 156, thus allowing the spring 146 within each mounting latch 138 to push its respective mounting latch 138 outwardly into the position shown in FIG. 10. Thereafter, when the stowage bin 102 is again positioned in the recess 103 in the tailgate 104, the mounting latches 138 will be in their outwardly biased positions and able to automatically engage within the openings 140 in structural wall portion 142 (FIG. 11a). Once the mounting latches 138 are secured within the openings 140, the rear portion of the bin body 108 is held securely against any movement or rattling. And likewise the forward wall 102a will be held against movement and rattling by engagement of the resilient bumpers 132a which engage within the recesses 134 of the forward wall 102a. The above-described arrange of mounting latches 138 and recesses 134 enable the stowage bin 102 to be completely suspended within the tailgate 104 and restrained against movement or rattling therein, as well as to be quickly and easily removed by a user without the need for any external tools.

With further brief reference to FIGS. 8 and 8a, each latch assembly 116 may engage a respective latching bracket 119 (FIG. 8a) which is fixedly secured to an inner wall surface 144c of the double U-shaped track 144 such as by rivets 122 or other suitable fasteners. The latching bracket 119 includes a pin 119a positioned within parallel flanges 119b. The latch assembly 116 may engage the pin 119a when the locking mechanism 110 is in a locked position such that the bin lid 106 is not able to be opened. When the locking mechanism 110 is moved into a locked orientation, the latch 116a is rotated clear of the pin 119a permitting the bin lid 106 to be lifted open.

Removal of the stowage bin 102 is accomplished by first unlocking and opening the bin lid 106. Then the release elements 154 are engaged to move them both into their retracted positions so that the mounting latches are retracted out from their associated openings 140 in structural member 138 of 142 of the tailgate 104. Then the rear wall 102b of the stowage bin 102 may be lifted up and slightly away from the vehicle, which enables the recesses 134 to clear the resilient elements 132a. Placing the stowage bin 102 back in the recess 103 is accomplished using the opposite sequence; i.e., by first engaging the recesses 134 with the resilient elements 132a, and then lowering the rear wall 102b of the stowage bin 102 into the recess 103. The mounting latches 138, having previously been released from their latched positions, will automatically engage with the openings 140.

With further reference to FIG. 13, to aid in carrying the stowage bin 102 when it is removed from the vehicle, one or more handles 162 may be included. In one embodiment the stowage bin 102 includes three handles 162, although it will be appreciated that a greater or lesser number of handles may be incorporated. The embodiment shown in FIG. 13 includes three handles 162 evenly spaced across the rear wall 102b of the bin body 108 within recesses 164. Thus, a single individual may use the center one of the handles 162, although if the stowage bin 102 is enclosing relatively heavy items, then two individuals may carry the stowage bin 102 by using the two outwardly positioned ones of the handles 162.

Figure 14:
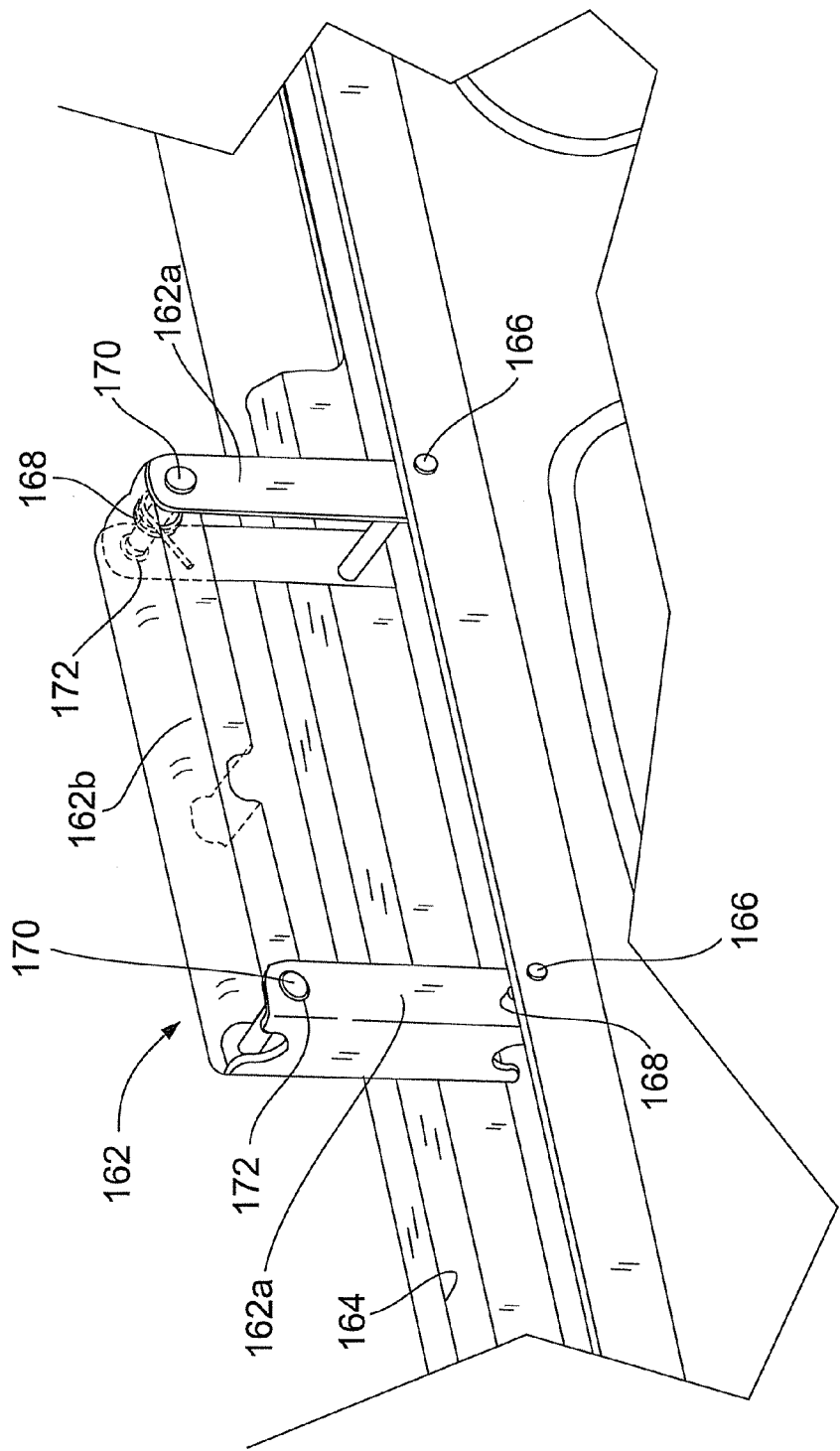
FIG. 14 is a perspective view showing one of the handles in its fully extended position.

With continuing reference to FIG. 14, each handle 162 is mounted within its respective recess 164 by a pair of axles 166. The axles 166 extend through holes 168 in side portions 162a of the handle 162, and through holes 173 (FIG. 10) in the first portion 144a of the double U-shaped track 144. A center portion 162b of the handle 162 is pivotally coupled via axles 170 which extend through holes 172 in the side portions 162a. The handles 162 are each graspable with a hand of the user. The side portions 162 may be pivoted about the axles 166 so that the entire handle 162a collapses within the recess 164 in a parallelogram-like fashion when not in use. To aid in collapsing the handle 162, a torsion spring 174 is positioned around one axle 170 of each of the handles 162. The torsion spring 174 provides a biasing force that wants to collapse the handle 162 into its retracted (i.e., stored) position in its associated recess 164 when it is not being grasped by the user.

As shown in FIG. 15, the stowage bin 102 may include a molded plastic or foam insert 180 having precisely dimensioned recesses to hold various items securely within the stowage bin 102 without shifting or rattling. In FIG. 15 a pair of load restraining bars 182 is shown being stowed within the stowage bin 102 in recesses that are shaped generally complementarily with the load restraining bars 182. A plurality of tie down cleats 184 are also shown being stowed in the stowage bin 102 within their own complementary shaped recesses. From FIG. 15 it will be appreciated that a wide range of articles may be stowed in the stowage bin 102. The insert 180 may also be removably mounted such that different inserts may be used with the stowage bin 102. For example, if a vehicle is being sold with a pair of load restraining bars, then one insert 180 could be placed in the stowage bin 102 to accommodate the load restraining bars. If no load restraining bars are being provided with the vehicle, then a different insert could be provided which allows other elements, for example a flashlight, warning signs, battery jumper cables, specific tools, etc., to be secured within the stowage bin 102. Alternatively, the bin body 108 itself may be molded with various recesses of predetermined shapes and dimensions so that the bin body 108 is able to restrain predetermined items therein without the need for the insert 180.

The systems 10 and 100 described herein also each serve to provide a relatively smooth surface, when their respective lids are closed, which enables cargo to be easily slid (or driven) over the bin lid when the lid is closed. As such, the systems 10 and 100 do not present any impediment or obstacle to loading or unloading cargo from the bed of the vehicle to which the tailgate 104 is attached. In effect, the lid of the stowage bin in each embodiment functions as a structural inside wall for the tailgate.

The system 10 thus forms a highly space efficient and convenient system for storing items in the tailgate of a pickup truck, sport utility vehicle, station wagon or other type of vehicle. The stowed items can be accessed quickly and easily without the need for separate tools or complicated disassembly/access procedures. Importantly, the system 10 holds the stowed items securely to eliminate, or virtually eliminate, any noise or rattling from the stowed items while the vehicle is moving. The system 10 does not add any significant weight to the vehicle, and does not significantly complicate or alter the assembly operations associated with manufacture of the vehicle.

The system 10 also is readily adaptable to carry a wide variety of items. The system 10 could be adapted with little or no modification to store not only cross bars and associated components such as tie down cleats, but also potentially telescoping tailgate ramps which can be extended and used to load cargo such as all terrain vehicles (ATVs) into and out from the bed of a pickup truck. Still further potential uses could be storing hunting equipment such as firearms, archery equipment such as hunting bows and/or cross bows, arrows, etc., as well as possibly fishing poles and related tackle boxes, wearable vests and/or waders. Still further potential uses may be to store camping equipment, small portable grills, small coolers, and possibly even small tents. It is possible that storage of recreational items such as collapsible kayak paddles, flotation vests, etc. could also be stowed using the system 10 with little or no modification. Further uses could be to enable contractors to store a wide variety of carpentry, masonry, electrical and/or plumbing tools or related equipment. Accordingly, the system 10, with only minor modifications, or possibly no modifications, can be adapted for a wide variety of uses to suit specific needs of the vehicle user.

And while the system 10 has been shown integrated into a downwardly opening tailgate of a pickup truck, it will be appreciated that the teachings of the present disclosure could just as readily be implemented in a vertically mounted door that pivots about a vertical pivot axis. Such a door is typically used at the rear of large commercial vans, which typically have two such doors that each swing outwardly for gaining access to the rear of the van. The various embodiments may also be implemented in the floor portion of a truck bed, a van or possibly even in the trunk of a sedan.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A stowage system for use with a moveable element of a motor vehicle, wherein the moveable element is moveable between first and second positions, and wherein the moveable element includes a recess formed therein, the system comprising:
   a stowage bin having a bin lid and a bin body hingedly connected to the bin lid to permit the bin lid to be opened, to permit access to an interior area of the bin body, and to permit the stowage bin to be closed to contain at least one component within the stowage bin;
   the bin lid and bin body forming a compartment when the bin lid is in a closed orientation to enable the component to be stowed therein;
   at least one mounting latch for securing the stowage bin within the recess of the door-like element, and which permits removal of the stowage bin from the recess only after the bin lid is opened, and without the use of external tools.

2. The system of claim 1, wherein the bin lid and said bin body are formed from plastic.

3. The system of claim 1, further comprising a locking mechanism to lock the bin lid and bin body closed when the bin lid is placed in the closed orientation.

4. The system of claim 1, wherein the at least one compartment is shaped to accommodate a load restraining bar.

5. The system of claim 1, wherein the system includes a pair of the mounting latches, with each said one of the pair of mounting latches being disposed at opposite sides of the bin body, each of the mounting latches being operably associated with a release element, each said release element being engageable by a finger of a hand of a user to permit a user to cause the release element to move its associated said mounting latch into a fully retracted position, wherein when both of the mounting latches are in their said retracted positions the stowage bin is removable from the door-like element.

6. The system of claim 5, wherein:
   the stowage bin includes a double U-shaped track having a first track portion within which the mounting latch may be moved slidably;
   the stowage bin includes a second track portion within which the release element may be moved slidably; and
   a plurality of openings in the second track portion to enable engagement of a portion of each one of the release elements in the openings, when the release elements move their respective said mounting latches into said retracted positions.

7. The system of claim 1, further comprising an insert shaped to rest within the bin body, the insert including at least one recess formed therein in accordance with a specific shape of the component to thus hold the component nestably, securely against movement when the bin lid is placed in a closed orientation.

8. The system of claim 7, wherein the insert is removable from the bin body.

9. The system of claim 7, wherein the recess in the insert is shaped to accommodate a load restraining bar.

10. The system of claim 1, wherein a portion of the stowage bin forms an inner wall for the moveable element.

11. The system of claim 1, wherein the stowage bin includes at least one handle which is collapsible into a stored position when the stowage bin is to be placed in the recess of the moveable element.

12. A load restraining and stowage system for use with a tailgate of a motor vehicle, wherein the motor vehicle includes a bed and the tailgate is able to be moved into a lowered position to gain access to the bed, the system comprising:
   a load restraining bar having a length sufficient to span a width of the bed, and releasably securable to vertical sidewall portions of the bed to extend between the vertical sidewall portions and act as a load restraining component to help prevent movement of articles placed within the bed while the vehicle is moving;
   a recess formed in the tailgate, the recess having a forward wall area with a first structure;
   a stowage bin placed in the recess in the tailgate, the stowage bin having a forward wall and a rearward wall edge;
   the stowage bin including a bin lid hingedly secured to a bin body such that the stowage bin forms a compartment within which the load restraining bar can be stowed when not in use in the bed;
   the stowage bin further including a second structure at the forward wall which is adapted to engage with the first structure at the forward wall area of the recess in the tailgate, to hold the forward wall of the stowage bin within the recess when the stowage bin is inserted into recess;
   a locking mechanism which secures the bin lid in a closed orientation relative to the bin body; and
   a pair of mounting latches located at the rearward wall edge of the stowage bin which enable the stowage bin to be releasably secured within the recess in the tailgate, and to be accessed to permit removal of the stowage big from the recess, and removed completely from the recess, only after the bin lid is opened, and without the need for external tools.

13. The system of claim 12, wherein the mounting latches are movable slidably relative to the bin body and spring biased into positions to project outwardly from the bin body.

14. The system of 12, further comprising a release element operably associated with each said mounting latch, for enabling a user to move each said mounting latch slidably using one or more fingers of a hand of the user.

15. The system 12, further comprising a double U-shaped track for mounting each of the mounting latch and the release element for sliding movement.

16. The system of claim 15, wherein the double U-shaped track has a first track portion along which the mounting latches may be moved slidably, and a second track portion along which the release elements may be moved slidably.

17. The system of claim 16, wherein the second track portion includes a pair of openings within which portions of the release elements may engage to hold the mounting latches in retracted positions, to thus enable the stowage bin to be removed from the recess.

18. The system of claim 17, wherein bin body includes openings aligned with the openings in the second track portion, the openings in the bin body having flexible button-like elements mounted thereat which enable a user to press thereon to urge the portions of the release elements out from the openings in the second track portion, and thus allow the mounting latches to be biased outwardly to engage with structure of the tailgate to latch a rear portion of the bin body within the recess of the tailgate.

19. A load restraining and stowage system for use with a tailgate of a motor vehicle, wherein the motor vehicle includes a bed and a tailgate that is able to be moved into a lowered position to gain access to the bed, the system comprising;
  a pair of support rails secured to vertical sidewalls of the bed;
  a pair of load restraining bars each having a length sufficient to span a width of the bed and having a telescopic construction to enable each said load restraining bar to assume a first length when secured in the bed to the pair of support rails, to thus help restrain an article being transported in the bed against movement, and a second length which is shorter than the first length when the load restraining bar is configured to be stowed in the tailgate;
  a recess formed in the tailgate;
  a stowage bin placed in the recess in the tailgate;
  the stowage bin including a bin lid and a bin body hingedly secured together along edges thereof such that the bin lid forms a cover and an inside wall surface of the tailgate, and the stowage bin forms a compartment within which the load restraining bars can be stowed when not in use in the bed;
  a pair of spring biased mounting latches arranged along a rear wall portion of the bin body, the spring biased mounting latches engaging with structure associated with the tailgate to secure the rear wall of the stowage bin within the recess;
  a pair of release latches operably associated with the spring biased mounting latches, the release latches each being engageable with one or more fingers of a user hand to permit the user to use the release latches to slidably move the mounting latches into retracted positions;
  a double U-shaped track having a first track portion within which the mounting latches are mounted, a second track portion within which the release elements are mounted, and a pair of openings in which portions of the release elements may engage to hold the mounting latches in their said retracted positions when the user releases the release latches;
  wherein the bin body includes structure enabling a forward wall portion of the bin body to be held by additional structure associated with the tailgate, such that the stowage bin is fully suspended within the tailgate and restrained against movement; and
  wherein the pair of release latches are only accessible by a user when the bin lid is in an open position.

20. The system of claim 19, wherein the stowage bin further includes at least one handle which is collapsible into a stored position when the stowage bin is to be placed in the recess of the tailgate.

21. A stowage system for use with a moveable element of a motor vehicle, wherein the moveable element is moveable between first and second positions, and wherein the moveable element includes a recess formed therein, the system comprising:
  a stowage bin having a bin lid and a bin body hingedly connected to the bin lid to permit the bin lid to be opened, to permit access to an interior area of the bin body, and to permit the stowage bin to be closed to contain at least one component within the stowage bin;
  the bin lid and bin body forming a compartment when the bin lid is in a closed orientation to enable the component to be stowed therein;
  at least one mounting latch for securing the stowage bin within the recess of the moveable element, and which permits removal of the stowage bin from the recess without the use of external tools; and
  wherein the system includes a pair of the mounting latches, with each said one of the pair of mounting latches being disposed at opposite sides of the bin body, each of the mounting latches being operably associated with a release element, each said release element being engageable by a finger of a hand of a user to permit a user to cause the release element to move its associated said mounting latch into a fully retracted position, wherein when both of the mounting latches are in their said retracted positions the stowage bin is removable from the moveable element.

22. The system of claim 21, wherein the stowage bin includes a double U-shaped track having a first track portion within which the mounting latch may be moved slidably;
  the stowage bin includes a second track portion within which the release element may be moved slidably; and
  a plurality of openings in the second track portion to enable engagement of a portion of each one of the release elements in the openings, when the release elements move their respective said mounting latches into said retracted positions.

* * * * *